W. L. WALKER.
SHOCK ABSORBER.
APPLICATION FILED MAR. 7, 1917.
1,417,002.
Patented May 23, 1922.
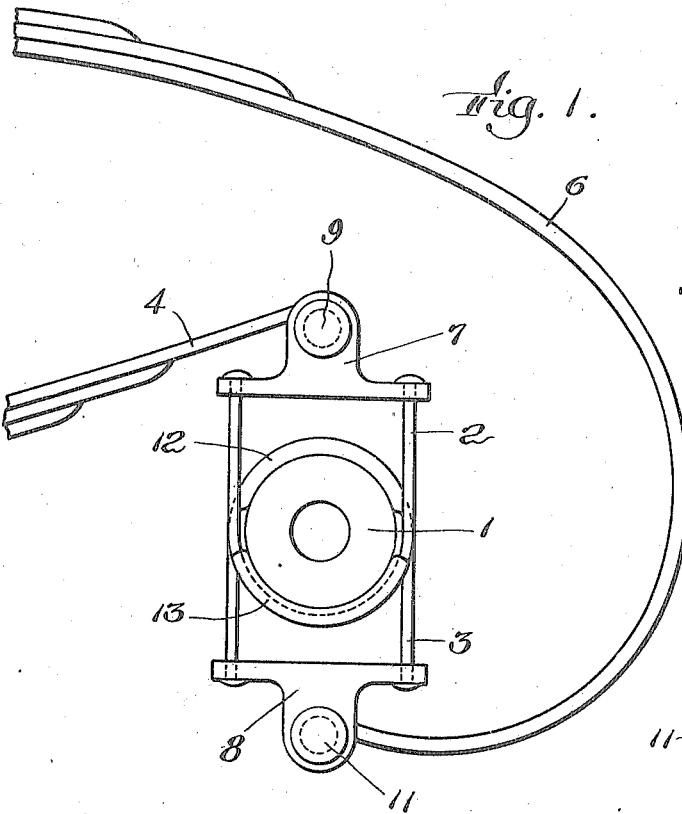
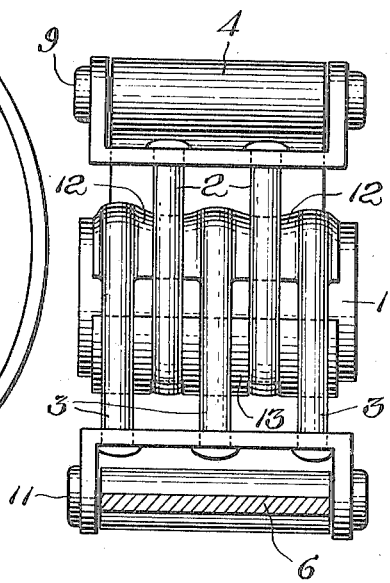
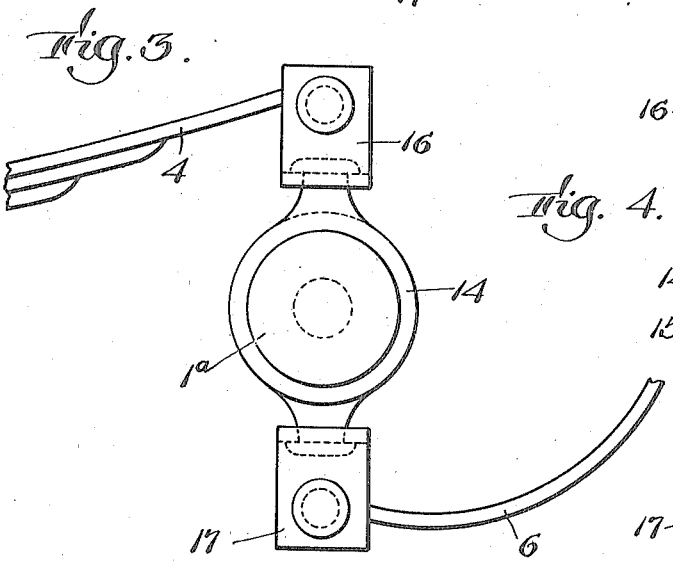
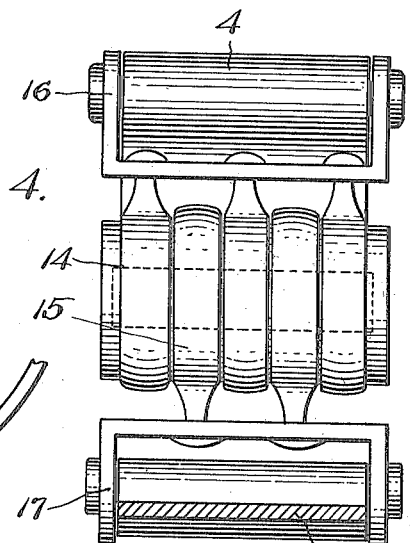
Inventor:
William L. Walker:
by Roberts Roberts & Cushman
His Attorneys.

UNITED STATES PATENT OFFICE.

WILLIAM L. WALKER, OF NEW YORK, N. Y.

SHOCK ABSORBER.

1,417,002.          Specification of Letters Patent.     Patented May 23, 1922.

Application filed March 7, 1917. Serial No. 153,143.

*To all whom it may concern:*

Be it known that I, WILLIAM L. WALKER, a citizen of the United States, and resident of New York, in the county of New York and State of New York, have invented new and useful Improvements in Shock Absorbers, of which the following is a specification.

This invention relates to a shock-absorbing device and more particularly to a cushioning device for use on automobiles either independently or in conjunction with ordinary vehicle springs of suitable type. However, in many of its forms the device is adapted for use in other relations as, for example, as a buffer between railroad cars or other cars, and in combination with elevators, hoisting machinery, and other machinery subjected to jolts, blows, impacts or other shocks whether sudden or comparatively slow.

A cardinal object of the invention is to provide a shock-absorber which is not only readily responsive to sudden impulses of force but which is adapted rapidly to absorb the impulses, thereby damping out the vibration and preventing the sustained oscillation ordinarily resulting from the sudden application of force to vehicle or other springs. Another cardinal object is to provide a shock-absorber which is double-acting and which thereby tends yieldingly to restrain and dampen motion in two directions so that when employed on an automobile, for example, the up and down motion of the body is yieldingly restrained in both directions.

Another object is to accomplish the aforesaid objects by employing a shock-absorbing material which inherently is readily responsive to distortive forces and which at the same time is adapted to damp vibration. A further object is to construct and arrange the shock-absorbing material so as to accentuate the aforesaid characteristics. A still further object is to arrange the yielding material in such manner as to be subjected to compression, flexure or tension or to two or more of these stresses.

Other objects of the invention are to provide a shock-absorbing device which is adapted to function efficiently through a wide range of loads, which is simple in construction and inexpensive, which has few parts and can be readily assembled, disassembled and repaired, which is compact and adapted to be applied to the ordinary automobile without modifying the spring or other parts of the vehicle.

Other objects of the invention will be apparent from the following description and the accompanying drawings, in which,—

Figure 1 is a side elevation of one embodiment of my invention, showing its application to automobile springs of the elliptical type;

Figure 2 is a rear elevation of the embodiment shown in Fig. 1;

Figure 3 is a side elevation of a modification of the invention, showing its relation to the elliptical springs; and Figure 4 is a rear elevation of the modification shown in Fig. 3.

The particular embodiment of the invention shown in Figs. 1 and 2 comprises a hollow cylindrical member 1 composed of a composition of rubber or other elastic resilient gum-like material and U-shaped connecting members 2 and 3 adapted to be respectively attached to the portions 4 and 6 of the vehicle springs through the medium of attachment members 7 and 8. The members 7 and 8 are preferably U-shaped in vertical cross section so that they may be readily attached to the spring members 4 and 6 at their opposite sides by means of shafts 9 and 11 passing through the end flanges of the members 7 and 8 and thence through the transverse openings commonly provided in the ends of the spring members. However, these particular members of the apparatus may be varied through wide limits depending upon the conditions in which it is desired to use the apparatus.

The connecting members 2 and 3 may also be constructed in any one of a number of forms within the scope of my invention. In the embodiment shown in Figs. 1 and 2 each connecting member comprises a plurality of U-shaped straps surrounding the cushioning member 1 and being riveted at their ends in the transverse portions of the attachment members 7 and 8. These U-shaped straps are preferably spaced apart and disposed in alternate relationship longitudinally of the cushioning member 1. The U-shaped straps may act upon the cushioning member either directly or indirectly through the medium of means such as the semi-cylindrical members 12 and 13, the members 12 and 13 either being formed integrally with the straps as illustrated at 12 or being formed separately from the straps as shown at 13 in which case grooves are preferably provided to receive the straps. The members 12 and 13 preferably extend less than 180° around the member 1 and are bent inwardly somewhat so as not to interfere with the respective U-shaped straps of the co-operating connecting members. Any desired number of the U-shaped straps may be provided on each connecting member depending upon the length and diameter of the cushioning member 1 and upon the magnitude of the load which the device is intended to carry.

The modification of the invention shown in Figs. 3 and 4 is similar to that shown in Figs. 1 and 2 but instead of U-shaped straps rings members 14 and 15 comprise the connecting members, these rings entirely surrounding the cushioning member 1 as shown in Figs. 3 and 4, although it is sufficient if they are substantially closed rings. These rings are mounted in the attachment members 16 and 17 in a similar manner to that in which the corresponding members are mounted in Figs. 1 and 2, the principal difference being that by virtue of the ring shape employed, the member may be mounted by means of a single rivet or other suitable connection.

In Figs. 3 and 4 I have also illustrated another feature of my invention which may be employed with either of the disclosed modifications of the invention. This feature comprises plugging the ends of the hollow cylindrical member 1ª and hermetically sealing the ends so that an air cushion is provided within the member 1ª.

The operation of the apparatus is as follows:

When employed with automobile springs as above described, the cushioning member is compressed by the connecting members surrounding it when the lower portion 4 of the spring is thrown upwardly due for example to the automobile striking the bump in the roadway. By employing a rubber-like elastic material of suitable composition and by employing it in a shape of suitable length and diameter the shock to the lower spring 4 is largely taken up in the cushioning member owing to the fact that this member when constructed as described is very yielding to distortive forces. Moreover, when employing connecting members such as shown in the figures the upward impulse imparted to the lower spring 4 is not only taken up and largely absorbed by the cushioning member, but the reaction from that portion of the impulse which is transmitted to the spring 6 is also taken up and deadened inasmuch as my improved shock absorbing device acts in both directions. Referring to Fig. 4, for example, it is apparent that the cushioning member 1ª is not only compressed when the members 16 and 17 move toward each other, but it is also compressed in exactly the same manner when the members 16 and 17 move apart. By providing an air cushion within the rubbery member the cushioning effect is very materially accentuated.

From the above description the marked contrast between my improved shock-absorbing device and the ordinary shock-absorber on the market today, which ordinarily consist of compressible springs, will be apparent. When employing the ordinary compressible spring the spring is compressed when the wheels of the automobile bounce upwardly but when the body rises in response to this impulse the spring is stretched and does not effectively serve to take up the upward movement of the body. Obviously, by varying the compound in the rubber cushioning member different degrees of elasticity may be obtained.

It is to be observed that my improved shock-absorber, in its preferred form, is adapted to utilize either one or all of the distortive stresses to which a cushioning member may be subjected, namely, compression, flexure and tension. In the form of the device shown in Figs. 3 and 4, for example, the cushioning member is not only subjected to compression, but it is also subjected to flexure and tension. When the members 16 and 17 are either forced together or pulled apart a sufficient amount the cushioning member is flexed and the portions of the cushioning member disposed between the alternate rings 14 and 15 are subjected to tension. Obviously, by spacing the rings farther apart the proportion of tensioning stress may be increased. Moreover, by bringing the rings into close relationship so that they substantially touch each other, the proportion of tensioning stress may be diminished.

The expression "set of members" as applied to the straps 2 or straps 3 in Figs. 1 and 2, or the rings 14 or the rings 15 in Figs. 3 and 4, is to be understood to be equally applicable whether the members of the set are connected together as in Figs. 1 and 2; or are separate as in Figs. 3 and 4.

I claim:

1. A shock-absorber for vehicles and the like comprising opposed bearing members, an elongate cushion interposed between said bearing members, members for attaching the bearing members to two relatively movable parts of the vehicle, the bearing members connecting with said attaching members lengthwise of said cushion at alternate intervals.

2. A shock-absorber for vehicles and the like comprising opposed bearing members, an elongate cushion interposed between said bearing members, said bearing members connecting with parts of the vehicle on the sides of said cushion opposite the bearing members respectively, and the respective bearing members connecting with said parts at alternate intervals on both sides of the cushion and lengthwise thereof.

3. A shock-absorber for vehicles and the like comprising an elongate cushion, bearing members engaging said cushion along opposite sides of the cushion, means for connecting the bearing members with parts of the vehicle on sides of the cushion opposite to the bearing members respectively, the connecting means of one bearing member alternating with the collecting means of the other bearing member lengthwise of said cushion and each bearing member connecting with the corresponding part of the vehicle on both sides of said cushion.

4. A shock-absorber for vehicles and the like comprising a cylindrical cushion, arcuate bearing members engaging said cushion along opposite sides of the cushion, means for connecting the bearing members with parts of the vehicle on sides of the cushion opposite to the bearing members respectively, the connecting means of one bearing member alternating with the connecting means of the other bearing member lengthwise of said cushion, and each bearing member connecting with the corresponding part of the vehicle on both sides of said cushion.

5. A shock-absorber for vehicle and the like comprising an elongate cushion, rings surrounding said cushion at intervals lengthwise of the cushion, certain of said rings being adapted to be connected to a part of the vehicle on one side of the cushion, and other of the rings being adapted to be connected to another part of the vehicle.

6. A shock-absorber for vehicles and the like comprising a cylindrical cushion composed of resilient composition, rings surrounding said cushion at intervals lengthwise of the cushion, certain of said rings being adapted to be connected to a part of the vehicle on one side of the cushion, and other of the rings being adapted to be connected to another part of the vehicle.

7. A shock-absorber for vehicles and the like comprising a hollow cylindrical cushion of resilient composition and rings surrounding said cushion at intervals, alternate rings being adapted to connect with parts of the vehicle on opposite sides of said cushion respectively.

Signed by me at New York, this twenty-sixth day of February, 1917.

WILLIAM L. WALKER.